(12) United States Patent
Samara-Rubio et al.

(10) Patent No.: US 6,775,425 B2
(45) Date of Patent: Aug. 10, 2004

(54) METHOD AND APPARATUS FOR ADJUSTING THE PHASE OF AN OPTICAL BEAM

(75) Inventors: Dean A. Samara-Rubio, San Jose, CA (US); Sean M. Koehl, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 112 days.

(21) Appl. No.: 10/183,103

(22) Filed: Jun. 26, 2002

(65) Prior Publication Data

US 2004/0001659 A1 Jan. 1, 2004

(51) Int. Cl.[7] ............................................. G02F 1/035
(52) U.S. Cl. ........................................ 385/3; 385/130
(58) Field of Search ............................ 385/3, 130–132

(56) References Cited

U.S. PATENT DOCUMENTS

| | | | |
|---|---|---|---|
| 4,746,183 A | 5/1988 | Soref et al. | |
| 4,787,691 A | 11/1988 | Lorenzo et al. | |
| 4,923,264 A | 5/1990 | Langer et al. | |
| 5,065,207 A | 11/1991 | Heinen | |
| 5,125,065 A | 6/1992 | Stoll et al. | |
| 5,136,670 A | 8/1992 | Shigematsu et al. | |
| 5,227,913 A | 7/1993 | McCaughan et al. | |
| 5,247,594 A | 9/1993 | Okuno et al. | |
| 5,263,102 A | 11/1993 | Hakogi | |
| 5,479,552 A | 12/1995 | Kitamura et al. | |
| 5,566,263 A | 10/1996 | Smith et al. | |
| 5,908,305 A | 6/1999 | Crampton et al. | |
| 5,915,051 A | 6/1999 | Damask et al. | |
| 6,178,280 B1 * | 1/2001 | Maxwell et al. | 385/123 |
| 6,298,177 B1 | 10/2001 | House | |
| 6,421,473 B1 * | 7/2002 | Paniccia et al. | 385/14 |
| 6,633,716 B2 * | 10/2003 | Csutak | 385/131 |

OTHER PUBLICATIONS

E.D. Novak, et al.,"Speed, Power, and Yield Comparison of Thin Bonded SOI versus Bulk SMOS Technologies," Proceedings 1994 IEEE International SOI Conference, Oct. 1994, VLSI Technology, Inc., San Jose, CA, pp. 41–42.

Kareenahalli, S.,"Experimental Confirmation of Phase Relationships of Multimode Interference Splitters Using a Shearing–Type Near–Field Sagnac Interferometer", IEEE Photonics Technology Letters, vol. 9, No. 7., pp. 937–939, Jul. 1997.

Rasmussen, T., "Design and Performance Evaluation of 1–by–64 Multimode Interference Power Splitter for Optical Communications", Journal of Lightwave Technology, vol. 13. No. 10., pp. 2069–2074, Oct. 1995.

Bachman, M., "General self–imaging properties in N×N multimode interference couplers including phase relations", Applied Optics, vol. 33, No. 18, pp. 3905–3911, Jun. 20, 1994.

(List continued on next page.)

*Primary Examiner*—Mark Tremblay
(74) *Attorney, Agent, or Firm*—Blakely, Sokoloff, Taylor & Zafman LLP

(57) ABSTRACT

Method and apparatus for adjusting the phase of an optical beam. In one aspect of the present invention, an optical device includes a substrate through which an optical beam is to be directed along an optical path. In one embodiment, the optical device includes an array of segments of optical phase-shifting structures along the path. In one embodiment, each respective one of the segments is to be selectively switched on or off to adjust a phase of the optical beam. In one embodiment, the optical phase-shifting structures include capacitive structures to induce the plasma optical effect to adjust the phase of an optical beam. In another embodiment, the optical phase-shifting structures include an electro-optic material such as Lithium Niobate.

22 Claims, 4 Drawing Sheets

OTHER PUBLICATIONS

Smit, M.K., "PHASAR–Based WDM–Devices: Principles, Design and Applications", IEEE Journal of Selected Topics in a Quantum Electronics, vol. 2, No. 2, pp. 236–250, Jun. 1996.

Soldano L.B., "Optical Multi–Mode Interference Devices Based on Self–ImagingL Principles and Applications", Journal of Lightwave Technology, vol. 13, No. 4, pp. 615–627, Apr. 1995.

Rajarajan, M., "Accurate Analysis of MMI Devices with Two–Dimensional Confinement", Journal of Lightwave Technology, vol. 14, No. 9, Sep. 1996.

Lorenzo, R.M., "Improved self–imaging Characteristics in 1×N multimode couplers", IEE Proc.–Optoelectron., vol. 145, No. 1, Feb. 1998.

* cited by examiner

METHOD AND APPARATUS FOR ADJUSTING THE PHASE OF AN OPTICAL BEAM

BACKGROUND OF THE INVENTION

1. Field of the Invention

The present invention relates generally to optical devices and, more specifically, the present invention relates to an optical device that can adjust a phase of an optical beam.

2. Background Information

The need for fast and efficient optical switches is increasing as Internet data traffic growth rate is overtaking voice traffic pushing the need for optical communications. Two commonly found types of optical devices are mechanical devices and electro-optic devices.

Mechanical devices such as switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In known electro-optic devices such as switching devices, interferometers, phase-shifters, etc., voltages are continuously applied to selected parts of a device to create electric fields within the device. The electric fields change the optical properties of selected materials within the device and electro-optic effect the optical beams. Electro-optic devices typically utilize electro-optical materials that combine optical transparency with voltage-variable optical behavior.

Optical phase shifters made from various materials such as Lithium Niobate (LiNbO$_3$), liquid crystals and Indium Phosphide (InP) may be driven with an analog control voltage where the phase shift is determined by the voltage level. The use of a single analog voltage is a comparatively simple and flexible control method. In most applications, a power supply, waveform generator, or servo loop can supply the voltage. When using the phase shifter in a complex system, however, digital signal processing techniques are often desired and a digital-to-analog converter (DAC) is used to generate the analog control signal.

BRIEF DESCRIPTION OF THE DRAWINGS

The present invention is illustrated by way of example and not limitation in the accompanying figures.

DETAILED DESCRIPTION

Methods and apparatuses for an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview of the various embodiments of the present invention, an optical beam is directed through an optical path disposed in a substrate having an optical device including a plurality of optical phase-shifting structures. In one embodiment, each of the plurality of optical phase-shifting structures is selectively switched on or off to shift or adjust a phase of the optical beam in response to a signal. In one embodiment, the signal is a digital signal that is directly converted into an optical phase shift of the optical beam as the optical beam is directed through the plurality of optical phase-shifting structures.

Figure 1:
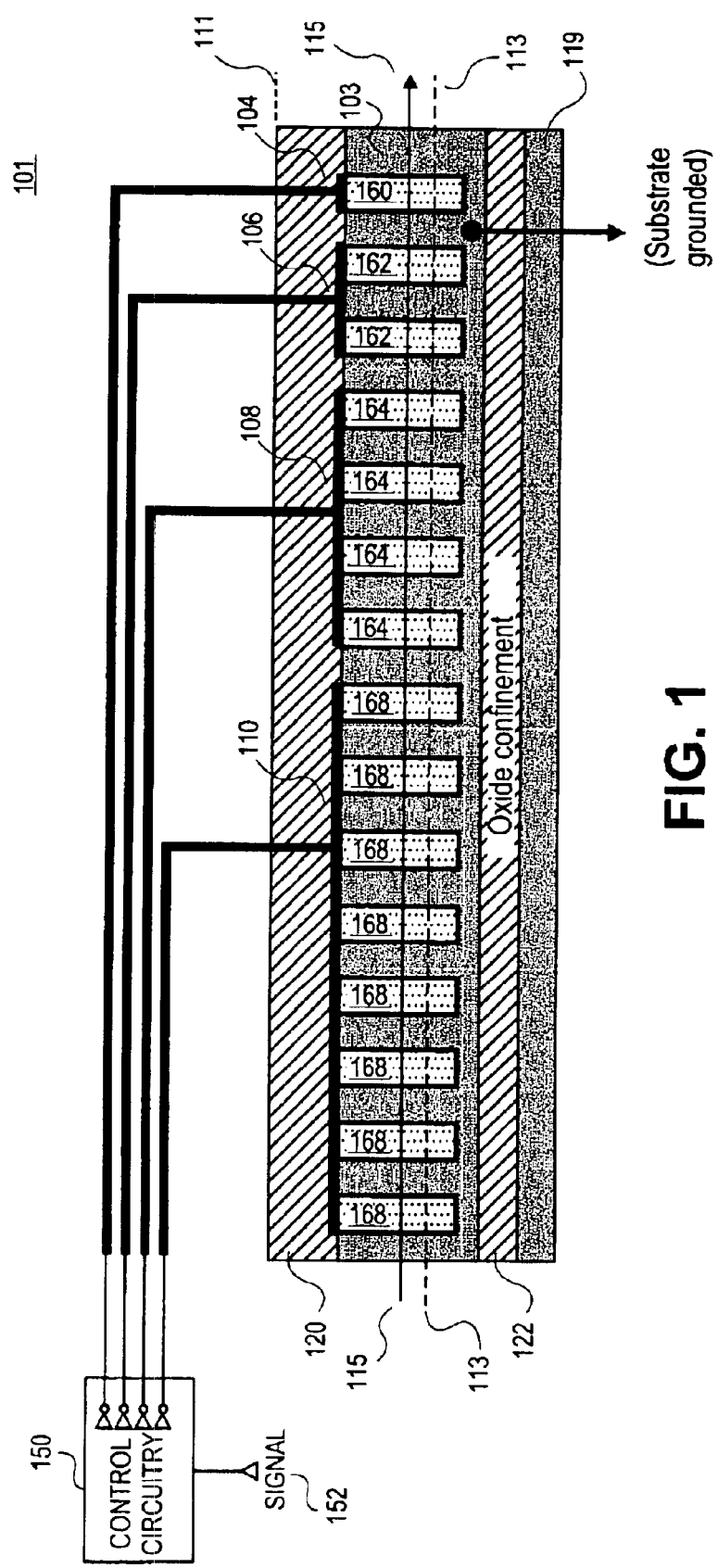
FIG. 1 is a side view illustration of one embodiment of an optical device having an array of segments of optical phase-shifting structures including capacitive structures disposed in a substrate in accordance with the teachings of the present invention.

To illustrate, FIG. 1 is a side view illustration of one embodiment of an optical device 101 in accordance with the teachings of the present invention. In one embodiment, optical device 101 includes a substrate 103 in which an array of discrete segments 104, 106, 108 and 110 having optical phase-shifting structures 160, 162, 164 and 168, respectively, are disposed along an optical path 113. In one embodiment, optical phase-shifting structures 160, 162, 164 and 168 include capacitive structures. In one embodiment, such capacitive structures include polysilicon. In one embodiment, substrate 103 includes a semiconductor substrate such as for example silicon.

As will be discussed below, in one embodiment, each respective one of segments 104, 106, 108 and 110 having optical phase-shifting structures 160, 162, 164 and 168 are selectively switched on or off by control circuitry 150 to adjust a phase of an optical beam 115 directed along optical path 113. In the depicted embodiment, the array of segments 104, 106, 108 and 110 is a binary-weighted array with the numbers of capacitive structures in each successive segment increasing by powers of two. As shown in the figures, segment 104 includes one optical phase-shifting structure 160, segment 106 includes two optical phase-shifting structures 162, segment 108 includes four optical phase-shifting structures 164 and segment 110 includes eight optical phase shifting structures 168. In one embodiment, each of the respective one of segments 104, 106, 108 and 110 is coupled to control circuitry 150 to be driven in response to a respective digital signal output from control circuitry 150 in response to signal 152. In one embodiment, signal 152 is an analog signal. In one embodiment, control circuitry 150 includes standard digital CMOS circuitry such as inverters or the like. In one embodiment, control circuitry 150 is included in the same semiconductor substrate 103 as optical phase shifting device 101.

In one embodiment, optical device 101 is included in a silicon-on-insulator (SOI) wafer 111. As shown in the embodiment depicted in FIG. 1, SOI wafer 111 includes a plurality of semiconductor and insulating layers. FIG. 1 shows that semiconductor substrate 103 is disposed between insulating layers 120 and 122 and that insulating layer 122 is disposed between semiconductor substrate 103 and another semiconductor substrate 119. In one embodiment, insulating layer 122 includes a buried oxide layer of SOI wafer 111 and insulating layer 120 includes an interlayer dielectric of SOI wafer 111. In one embodiment, insulating layers are also included along the sides of optical device 101 (not shown for reasons of clarity).

In one embodiment, the insulating layers along the sides of optical device 101 and insulating layers 120 and 122 serve as optical confinement layers of optical device 101. In simplified terms, during light propagation, optical energy or light from optical beam 115 is reflected from the interfaces between semiconductor substrate 103 and insulating layers 120 and 122. For example, light from optical beam 115 will have an angle of incidence θ relative to the interface between semiconductor substrate 103 and insulating layer 120 or 122. For purposes of this disclosure, an incident angle θ is the angle that an optical beam makes with an imaginary line perpendicular to a surface at the point of incidence. In the embodiment depicted in FIG. 1, optical beam 115 is deflected off the interface between semiconductor substrate 103 and insulating layer 120 or 122 because of total internal reflection.

In one embodiment, insulating layers 120 and 122 include silicon oxide or the like and have an index of refraction of approximately $n_{oxide}=1.5$. Semiconductor substrate 103 includes silicon and has an index of refraction of approximately $n_{Si}=3.5$. In order to have total internal reflection of optical beam 115, the incident angle θ of optical beam 115 relative to the interface between semiconductor substrate 103 and insulating layer 120 or 122 satisfies the following relationship:

$$\text{Sin } \theta > n_{oxide}/n_{Si} \quad \text{(Equation 1)}$$

In basic operation, as a result of the total internal reflection, optical beam 115 is in one embodiment confined to remain within semiconductor substrate 103 and pass through optical phase-shifting structures 160, 162, 164 and 168 along optical path 113 as shown in FIG. 1.

In one embodiment, semiconductor substrate 103 includes a three-dimensional waveguide including optical path 113 disposed in semiconductor substrate 103. In one embodiment, the waveguide is a rib waveguide. In another embodiment, the waveguide is a strip waveguide or other suitable waveguide. In one embodiment, optical beam 115 is directed along optical path 113 routed through the optical waveguide. Optical beam 115 includes infrared or near infrared light in one embodiment. As known to those skilled in the art, the silicon and polysilicon of one embodiment of semiconductor substrate 103 and optical phase-shifting structures 160, 162, 164 and 168 are partially transparent to the infrared or near infrared light. In an embodiment in which optical device 101 is utilized in optical communications, optical beam 115 has one or more channels or wavelengths around approximately 1.55 or 1.3 micrometers.

Figure 2:
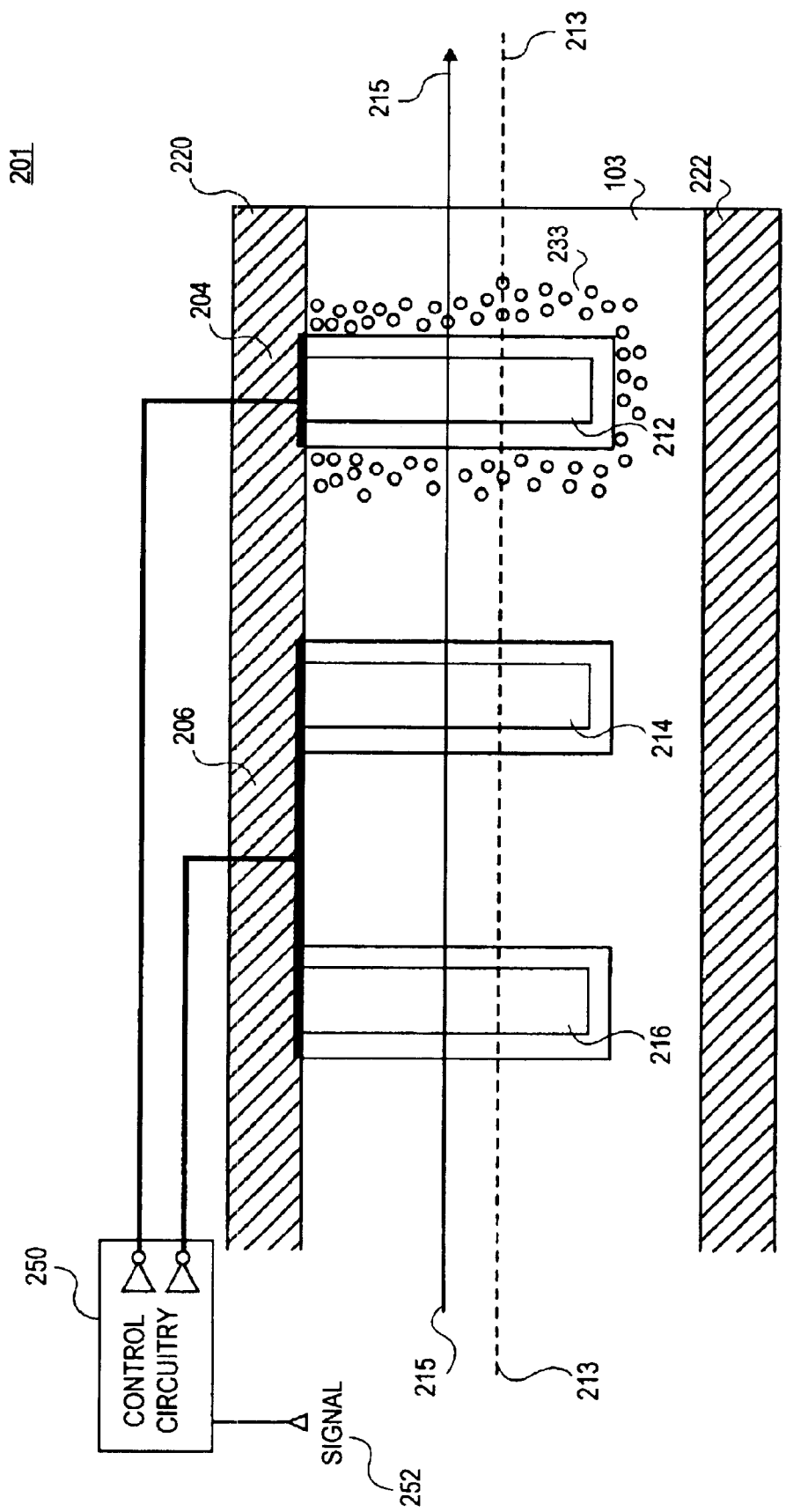
FIG. 2 is a side view illustration of a portion of an optical device similar to the device of FIG. 1 in accordance with the teachings of the present invention.

FIG. 2 is a side view illustration showing a portion of an optical device similar to optical device 101 of FIG. 1 in accordance with the teachings of the present invention. In one embodiment, a segment 204 includes one optical phase-shifting structure 212 and segment 206 includes two optical phase-shifting structures 214 and 216. In the depicted embodiment, optical phase-shifting structure 212 of segment 204 is switched on or activated to adjust a phase of optical beam 215 directed along optical path 213. In the depicted embodiment, optical phase-shifting structures 212, 214 and 216 include capacitive structures such as for example, polysilicon trench capacitors. In one embodiment, control circuitry 250 controls a charge concentration in a respective one of segments 204 and 206.

In operation, when segment 204 is activated, a control voltage is provided so that free charge carriers 233 accumulate in charged regions surrounding optical phase-shifting structure 212 of segment 204. In the depicted embodiment, segment 206 is switched off or inactivated so that no voltage is provided to optical phase-shifting structures 214 and 216 of segment 206. Thus, in an embodiment, the phase of optical beam 215 is adjusted by an amount proportional to the charge accumulated by single optical phase-shifting structure 212.

In one embodiment, the phase of optical beam 215 is shifted or adjusted as it propagates along optical path 213 through free charge carriers 233 due to the plasma optical effect. In particular, the plasma optical effect arises due to an interaction between the optical electric field vector and free charge carriers 233 that may be present along the optical path 213 of optical beam 215 through semiconductor substrate 203, and optical phase-shifting structures 212, 214 and 216. The electric field of optical beam 215 polarizes free charge carriers 233 and this effectively perturbs the local dielectric constant of the medium. This in turn leads to a perturbation of the refractive index of the medium and hence the propagation velocity of optical beam 215 since the refractive index is simply the ratio of the speed of the light in a vacuum to that in the medium. Free charge carriers 233 are accelerated by the optical beam's electromagnetic field which leads to absorption of the optical field as electromagnetic energy is transformed into kinetic energy. Generally the refractive index perturbation is a complex number with the real part being that part which causes the velocity change and the imaginary part being related to the free charge carrier absorption. In the case of the plasma optical effect in silicon, the refractive index change Δn due to the electron (ΔN$_e$) and hole (ΔN$_h$) concentration change is given by:

$$\Delta n = -\frac{e^2\lambda^2}{8\pi^2c^2\varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 2)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters.

Accordingly, in one embodiment, adjusting a phase of optical beam 215 includes adjusting the phase of optical beam 215 proportional to charge accumulated by the optical phase-shifting structures. Thus, in an embodiment, segments 104, 106, 108 and 110 of FIG. 1 or segments 204 and 206 of FIG. 2 are selectively switched on or off to provide a phase shift to optical beam 115 or 215, respectively, proportional to the number of optical phase-shifting structures activated in response to a digital signal. In one embodiment, each of the respective segments is driven in response to a digital signal so that different combinations of activated or inactivated segments may be used to achieve the desired phase shift. In one embodiment, as depicted in FIGS. 1 and 2, the optical beam is directed through an array of binary-weighted segments of optical phase-shifting structures so that the phase shift is proportional to a digital binary number output from the control circuitry.

In one embodiment, linearization of an optical phase shift is possible because each segment has one of two digital values for the effective refractive index, $n_R$. For example, if $V_R$ is the output corresponding to a voltage applied to the Rth segment and $n_0$ is the refractive index of the material included in an optical phase-shifting structure, the effective refractive index of the Rth segment, $n_R$, is:

$$n_R = n_0, \text{ for } V_R = \text{"0"}$$

or $$n_R = n_0 - \delta n_1, \text{ for } V_R = \text{"1"},$$

where $\delta n_1$ is the change in the refractive index that occurs when adding the charge induced by a voltage from control circuitry 250 corresponding to an output of "1".

Accordingly, the total optical phase shift in the optical beam is equal to the change in optical path length divided by the wavelength $\lambda$, $$\phi_{total} = (1/\lambda) * \Sigma_R \{2^R L_0\} * \{n_R - n_0\} = (1/\lambda) * \Sigma_R \{2^R L_0\} * V_R \quad \text{(Equation 3)}$$

where $L_0$ is the width of an optical phase-shifting structure, or, in an embodiment, the smallest discrete number of optical phase-shifting structures in optical device 201.

It is appreciated that optical phase shifting devices 101 and 201 may include as many or as few segments as needed in order to induce a desired optical phase shift in an optical beam. For example, in an embodiment, optical device 101 has sixteen segments of optical phase-shifting structures.

In one embodiment, as mentioned previously, each of the respective one of segments such as for example 204 and 206 are driven by digital signals output from CMOS inverters included in control circuitry 250 in response to signal 252. In one embodiment, power dissipation on or near optical device 201 must be carefully controlled because the optical index of refraction of the waveguide is sensitive to temperature. For example, a one degree Celsius change in temperature of a 3 mm long waveguide may cause a full $2\pi$ phase shift. In one embodiment, the low standby power dissipation in the CMOS inverters included in control circuitry 250 in response to signal 252 allows substantial integration of physical layer drivers. In one embodiment the inverters may be coupled to segments 204 and 206 immediately proximate to insulating layer 220. In other embodiments the inverters may be located at other locations on a semiconductor die of optical device 201. In another embodiment, control circuitry 250 including the inverters may be located external to the die of optical device 201.

Figure 3:
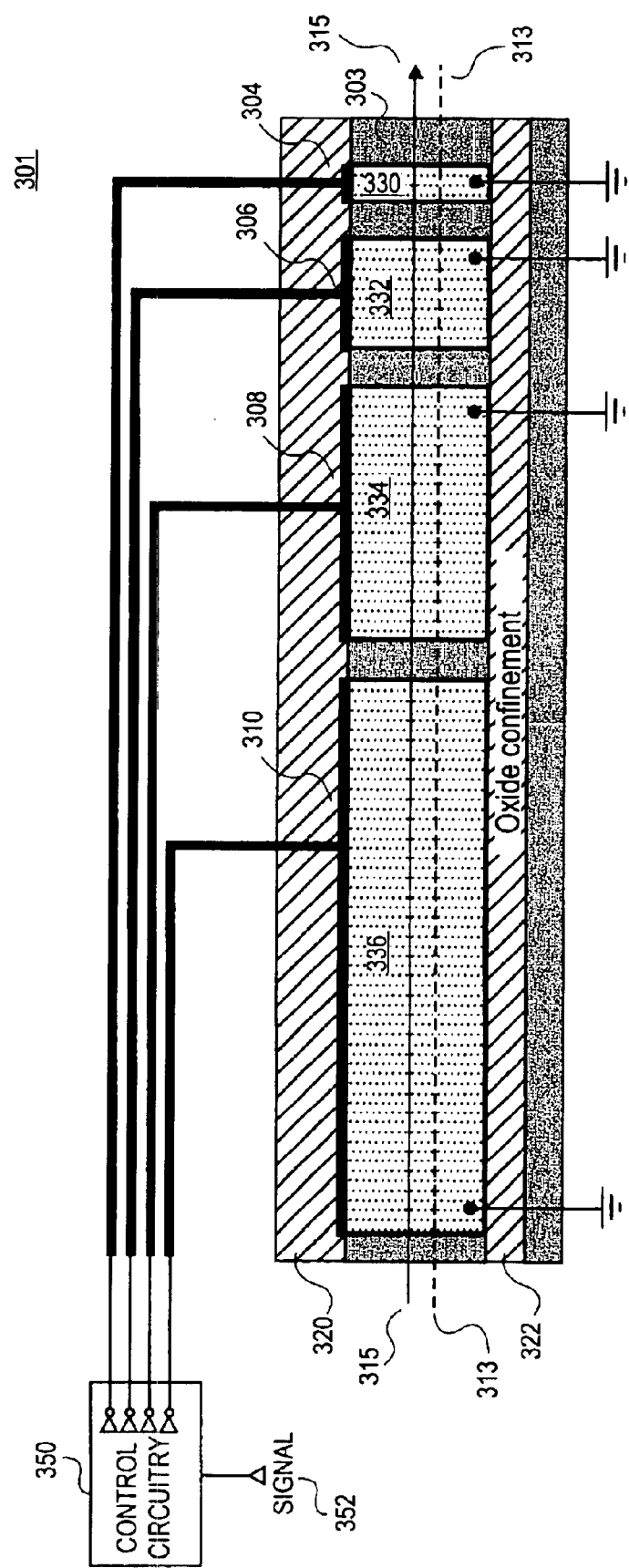
FIG. 3 is a side view illustration of one embodiment of an optical device having an array of segments of optical phase-shifting structures including an electro-optical material in accordance with the teachings of the present invention.

FIG. 3 is a side view illustration of another embodiment of an optical device in accordance with the teachings of the present invention. In one embodiment, an optical device 301 is disposed in a substrate 303 and has an array of discrete segments 304, 306, 308 and 310 having optical phase-shifting structures 330, 332, 334 and 336 including an optical material that exhibits the electro-optic effect, such as for example, Lithium Niobate. In one embodiment, substrate 303 includes a semiconductor substrate such as for example silicon.

In one embodiment, each respective one of segments 304, 306, 308 and 310 are selectively switched on or off by control circuitry 350 to adjust a phase of an optical beam 315 directed along optical path 313. In particular, the optical material of optical phase-shifting structures 330, 332, 334 and 336 changes in refractive index in the presence of an electric field due to the electro-optic effect. In operation, when a segment 304, 306, 308 or 310 is activated, a control voltage is provided to apply an electric field across at least one of optical phase-shifting structures 330, 332, 334 and 336 to create a variation in the refractive index of the $LiNbO_3$ to vary an effective propagation velocity of optical beam 315 directed along optical path 313.

In one embodiment, adjusting a phase of optical beam 315 directed along optical path 313 includes adjusting the phase substantially in proportion to an amount of optical material to which the electric field is applied and through which optical beam 315 is directed. In the depicted embodiment, the array of segments 304, 306, 308 and 310 is a binary-weighted array. In one embodiment, each of the respective one of segments 304, 306, 308 and 310 is coupled to be driven by a digital signal output from a respective one of inverters included in control circuitry 350. In one embodiment, control circuitry 350 outputs the digital signals received by segments 304, 306, 308 and 310 in response to signal 352. In one embodiment signal 352 may be an analog signal.

In the depicted embodiment, four segments of optical device 301 are shown, however, it is appreciated that optical device 301 may include as many or as few segments as needed in order to induce a desired optical phase shift in an optical beam.

Figure 4:
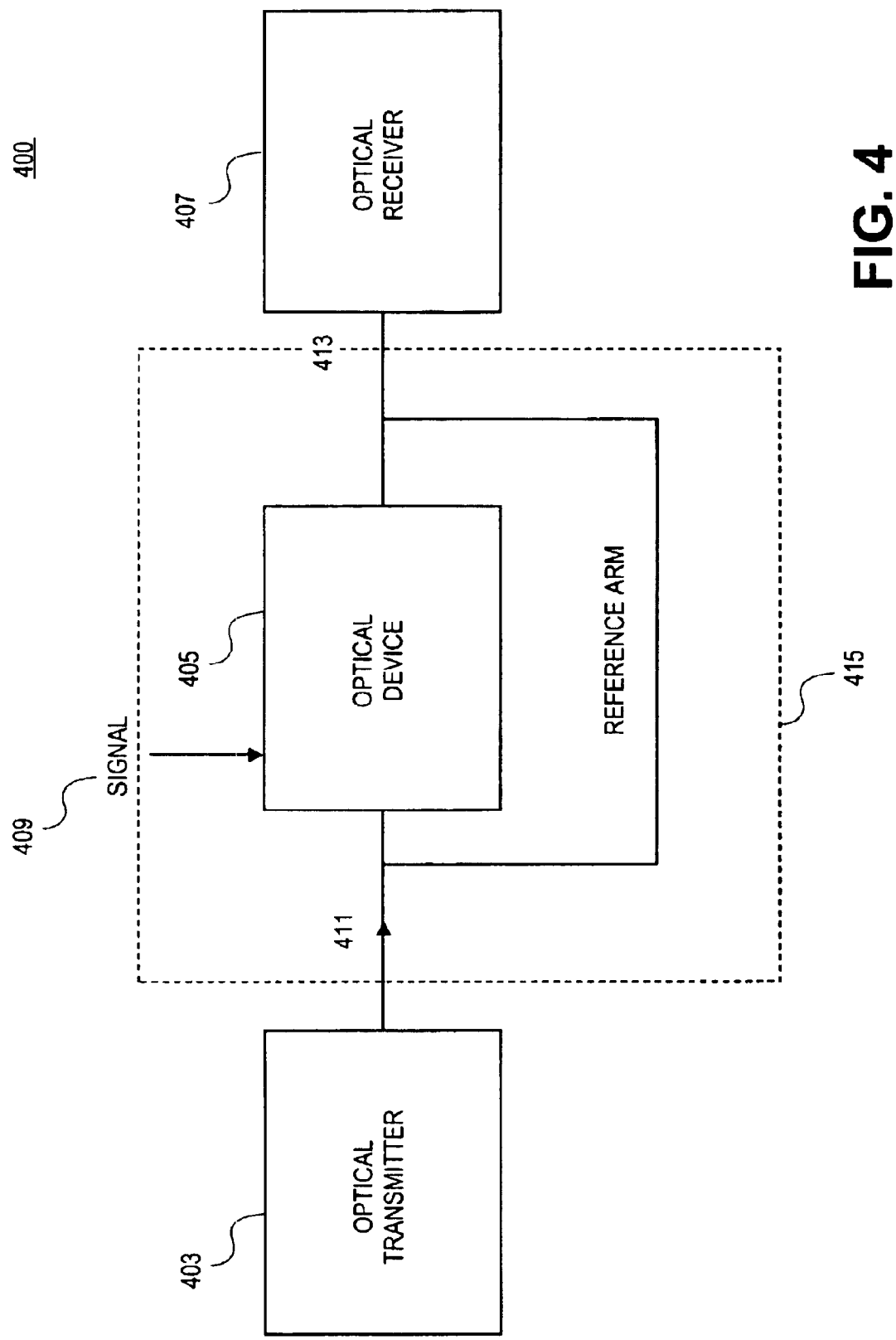
FIG. 4 is a block diagram illustration of one embodiment of a system including an optical transmitter and an optical receiver with an optical device according to embodiments of the present invention to adjust a phase of an optical beam directed from the optical transmitter to the optical receiver.

FIG. 4 is a block diagram illustration of one embodiment of a system including an optical transmitter and an optical receiver with an optical device according to embodiments of the present invention to adjust a phase of an optical beam directed from the optical transmitter to the optical receiver. In particular, FIG. 4 shows optical system 400 including an optical transmitter 403 and an optical receiver 407. In one embodiment, optical system 400 also includes an optical device 405 optically coupled between optical transmitter 403 and optical receiver 407. As shown in FIG. 4, optical transmitter 403 transmits an optical beam 411 that is received by optical device 405.

In one embodiment, optical device 405 may be included in for example a Mach-Zehnder interferometer 415 or another suitable device. As shown in the depicted embodiment, Mach-Zehnder interferometer 415 includes optical device 405 in one arm. Optical device 405 may include an array of segments having optical phase-shifting structures such as optical phase-shifting structures 160, 162, 164 and 168 of FIG. 1 or optical phase-shifting structures 330, 332, 334 or 336 of FIG. 3, or another suitable structures in accordance with the teachings of the present invention. As shown in the depicted embodiment, the other arm (e.g. reference arm) of Mach-Zehnder interferometer 415 does not include optical device 405. Accordingly, the phase of optical beam 411 is modulated or adjusted due to interference between the two arms of the Mach-Zehnder interferometer 415 in response to a signal 409 received by optical device 405. Accordingly, the phase of optical beam 411 is modulated due to interference between the two arms of the Mach-Zehnder interferometer 415 in response to a signal 409 received by optical device 405. A modulated optical beam 413 is then generated as a result from optical device 405, which is then directed from optical device 405 to optical receiver 407. In another embodiment (not shown), optical device 405 may be included in an optical switch to direct a light beam from optical transmitter 403 to one of two or more different optical paths. In an embodiment, the optical beam may be received by optical receiver 407 or another receiver in an optical network.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
 a substrate through which an optical beam is to be directed along an optical path through the substrate; and
 an optical device including an array of segments of optical phase-shifting structures disposed along the optical path, wherein the array of segments of optical phase-shifting structures is a binary-weighted array, each respective one of the segments to be selectively switched on or off to adjust a phase of the optical beam.

2. The apparatus of claim 1 wherein the substrate is included in a silicon-on-insulator (SOI) wafer.

3. The apparatus of claim 1 wherein the optical phase-shifting structures comprise capacitive structures.

4. The apparatus of claim 1 further including control circuitry to control a charge concentration in a respective one of the segments of optical phase-shifting structures.

5. The apparatus of claim 4 wherein each of the respective one of the segments is driven in response to a digital signal.

6. The apparatus of claim 5 wherein the digital signal is output from the control circuitry.

7. The apparatus of claim 6 wherein the control circuitry includes an inverter.

8. The apparatus of claim 6 wherein the control circuitry is coupled to output the digital signal in response to an analog signal received by the control circuitry.

9. The apparatus of claim 1 further comprising an optical waveguide disposed in the substrate, the optical path routed through the optical waveguide.

10. The apparatus of claim 1 wherein the optical phase-shifting structures include lithium niobate.

11. A method, comprising:
 directing an optical beam through an optical path disposed in a substrate having an optical device including a plurality of optical phase-shifting structures;
 directing the optical beam through the plurality of optical phase-shifting structures disposed along the optical path, wherein directing the optical beam through the plurality of optical phase-shifting structures includes directing the optical beam through an array of binary-weighted segments of optical phase-shifting structures; and
 selectively switching on and off each of the plurality of optical phase-shifting structures to adjust a phase of the optical beam in response to a signal.

12. The method of claim 11 wherein selectively switching on and off each of the plurality of optical phase-shifting structures includes selectively switching on and off discrete segments of optical phase-shifting structures.

13. The method of claim 11 wherein selectively switching on and off each of the plurality of optical phase-shifting structures includes selectively switching on and off each of the plurality of optical phase-shifting structures in response to an analog signal.

14. The method of claim 11 wherein adjusting a phase of the optical beam includes adjusting the phase of the optical beam in proportion to charge accumulated in the optical phase-shifting structures.

15. The method of claim 11 wherein selectively switching on and off each of the plurality of optical phase shifting structures to adjust a phase of the optical beam includes adjusting a phase of the optical beam due to the plasma optical effect.

16. The method of claim 11 wherein adjusting a phase of the optical beam includes adjusting the phase in proportion to an amount of lithium niobate to which an electric field is applied.

17. A system, comprising:
 an optical transmitter to transmit an optical beam;
 an optical receiver optically coupled to the optical transmitter to receive the optical beam; and
 an optical device including an array of segments of optical phase-shifting structures disposed along an optical path, wherein the array of segments of optical phase-shifting structures is a binary weighted array, each respective one of the segments to be selectively switched on or off to adjust a phase of the optical beam, the optical device to be coupled between the optical transmitter and the optical receiver.

18. The system of claim 17 wherein each of the respective one of the segments is driven in response to a digital signal.

19. The system of claim 17 wherein the optical phase-shifting structures include an optical material that exhibits the electro-optic effect.

20. The system of claim 19 wherein the optical material comprises Lithium Niobate.

21. The system of claim 17 wherein the optical phase-shifting structures include an optical material that induces the plasma optical effect.

22. The system of claim 16 further including control circuitry coupled to the array of segments of optical phase-shifting structures to selectively switch on or off each respective one of the segments of optical phase-shifting structures.

* * * * *